United States Patent
Goto (10) Patent No.: US 8,928,172 B2
(45) Date of Patent: Jan. 6, 2015

(54) BOOSTER CONTROL APPARATUS AND AN IDLING-STOP SYSTEM USING THE SAME

(75) Inventor: Toshio Goto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 246 days.

(21) Appl. No.: 13/145,296

(22) PCT Filed: Nov. 12, 2009

(86) PCT No.: PCT/JP2009/069282
§ 371 (c)(1),
(2), (4) Date: Jul. 19, 2011

(87) PCT Pub. No.: WO2011/058633
PCT Pub. Date: May 19, 2011

(65) Prior Publication Data
US 2012/0212046 A1    Aug. 23, 2012

(51) Int. Cl.
*B60L 1/00*  (2006.01)
*F02D 29/02*  (2006.01)
*F02D 17/04*  (2006.01)
*F02N 11/08*  (2006.01)

(52) U.S. Cl.
CPC ............... *F02D 29/02* (2013.01); *F02D 17/04* (2013.01); *F02N 11/0814* (2013.01); *F02N 11/0866* (2013.01); *B60W 2510/244* (2013.01); *F02N 2011/0885* (2013.01); *F02N 2011/0888* (2013.01); *Y02T 10/48* (2013.01)
USPC .......................................................... 307/9.1

(58) Field of Classification Search
CPC ..... F02D 17/04; F02D 29/02; F02N 11/0814; F02N 11/0866; F02N 2011/0885; F02N 2011/0888; B60W 2510/244
See application file for complete search history.

(56) References Cited

U.S. PATENT DOCUMENTS

| 7,552,705 B2 * | 6/2009 | Serkh et al. ................. 123/179.4 |
| 2005/0067999 A1* | 3/2005 | Okamura et al. .............. 318/800 |
| 2006/0097579 A1* | 5/2006 | Okuda et al. .................. 307/103 |

(Continued)

FOREIGN PATENT DOCUMENTS

| JP | A-2002-038984 | 2/2002 |
| JP | A-2005-229756 | 8/2005 |

(Continued)

OTHER PUBLICATIONS

International Search Report in International Application No. PCT/JP2009/069282; Dec. 8, 2009 (with English-language translation).

*Primary Examiner* — Jared Fureman
*Assistant Examiner* — Joel Barnett
(74) *Attorney, Agent, or Firm* — Oliff PLC (57) ABSTRACT

A booster control apparatus for controlling a booster provided between a battery and a load in an idling-stop vehicle in which a boosting operation of the booster is initiated in connection with a restart of an engine after an idling-stop, is disclosed. When the boosting operation of the booster is initiated in connection with the restart of the engine after the idling-stop, the booster control apparatus sets the target voltage in such a manner that the target voltage gradually increases from a second target voltage, which corresponds to the battery voltage at the beginning of the boosting operation of the booster, to a first target voltage which corresponds to the battery voltage at the time of a stop of the engine.

5 Claims, 9 Drawing Sheets

(56) References Cited

U.S. PATENT DOCUMENTS

| | | |
|---|---|---|
| 2007/0152641 A1 | 7/2007 | Kusafuka et al. |
| 2008/0012512 A1* | 1/2008 | Kawakami et al. ............ 318/143 |
| 2008/0203816 A1* | 8/2008 | Fujita .............................. 307/48 |
| 2008/0205086 A1* | 8/2008 | Darroman et al. ............... 363/15 |

FOREIGN PATENT DOCUMENTS

| | | |
|---|---|---|
| JP | A-2005-237149 | 9/2005 |
| JP | A-2007-056728 | 3/2007 |
| JP | A-2009-142089 | 6/2009 |

* cited by examiner

BOOSTER CONTROL APPARATUS AND AN IDLING-STOP SYSTEM USING THE SAME

TECHNICAL FIELD

The present invention relates to a booster control apparatus, an idling-stop system using the same and a booster control method in an idling-stop vehicle.

BACKGROUND ART

The idling-stop vehicle is known which performs an idling-stop for automatically stopping an engine for the time being when the vehicle stops due to the wait at traffic lights or the like. JP 2002-38984 discloses an arrangement in such an idling-stop vehicle in which a booster circuit for boosting the battery voltage is provided between the battery and an electrical load. The booster is activated when the battery voltage falls below a first set value due to an operation of a starter at the time of an engine start condition being met. The booster is stopped when the battery voltage increases above a second set value due to an operation of an alternator after the completion of the engine start.

JP 2005-237149 discloses a technique directed to reducing such a change in the output voltage before and after the operation of the booster, wherein when the booster is activated in connection with the restart of the engine after the idling-stop, a target voltage of the booster is set based on the battery voltage immediately before the activation of the booster. Further, JP 2005-237149 discloses another embodiment in which the target voltage of the booster circuit is set in such a manner that voltage of the booster circuit is reduced gradually over a time with a predetermined voltage drop rate from the battery voltage immediately before the activation of the booster to a predetermined lower limit voltage.

At the time of a restart of an engine after an idling-stop, it is possible to improve stability of the operation of the load provided on the output side of the booster if the booster boosts the battery voltage which otherwise would be reduced greatly due to the operation of the starter. However, since the battery voltage is reduced during the idling-stop, there could be a large variation in an output voltage of the booster circuit at the beginning of the boosting operation if a manner of setting the target voltage of the booster circuit at the beginning of the boosting operation is not appropriate. Further, if the load is low at the time of the completion of the cranking of the engine, the battery voltage (and output voltage of the alternator) increases rapidly. Thus, there could be a large variation in an output voltage of the booster circuit at the time of such a rapid increase in the battery voltage, if a manner of setting the target voltage of the booster circuit at the time around the completion of the cranking is not appropriate. If such a large variation in an output voltage of the booster circuit occurs, problems such as blinking of a meter display installed in an instrument panel and lighting equipment such as a head light, etc., occur.

DISCLOSURE OF INVENTION

Therefore, it is an object of the present invention to provide a booster control apparatus, an idling-stop system using the same and a booster control method by means of which a variation in an output voltage of the booster circuit at the time of an engine start (including a restart of an engine after an idling-stop) can be reduced.

In order to achieve the aforementioned objects, according to the first aspect of the present invention a booster control apparatus is provided for controlling a booster provided between a battery and a load in an idling-stop vehicle in which a boosting operation of the booster is initiated in connection with a restart of an engine after an idling-stop, said booster control apparatus comprising:

a first target voltage determination part configured to determine a first target voltage, based on a detected value or an estimated value of a voltage of the battery at the beginning of the idling-stop;

a second target voltage determination part configured to determine a second target voltage, based on a detected value or an estimated value of a voltage of the battery at the beginning of the boosting operation of the booster;

a target voltage setting part configured to set a target voltage for an output voltage of the booster; and a controlling part configured to control the booster based on the target voltage set by the target voltage setting part in such a manner that the output voltage of the booster follows the target voltage, wherein when the boosting operation of the booster is initiated in connection with the restart of the engine after the idling-stop, the target voltage setting part sets the target voltage in such a manner that the target voltage gradually increases from the second target voltage determined by the second target voltage determination part to the first target voltage determined by the first target voltage determination part.

According to the present invention, a booster control apparatus, etc., can be obtained, by means of which a variation in an output voltage of the booster circuit at the time of an engine start (including a restart of an engine after an idling-stop) can be reduced.

BRIEF DESCRIPTION OF THE DRAWINGS

These and other objects, features, and advantages of the present invention will become more apparent from the following detailed description of preferred embodiments given with reference to the accompanying drawings, in which.

EXPLANATION FOR REFERENCE NUMBER 1 idling-stop system
10 battery
12 alternator
18 starter
20 booster circuit
22 booster control apparatus
22a first target voltage determination part
22b second target voltage determination part
22c target voltage pattern setting part
22d feedback control part
30 load
40,42 voltage detection circuit
50 EFI ECU
52 engine

BEST MODE FOR CARRYING OUT THE INVENTION

In the following, the best mode for carrying out the present invention will be described in detail by referring to the accompanying drawings.

Figure 1:
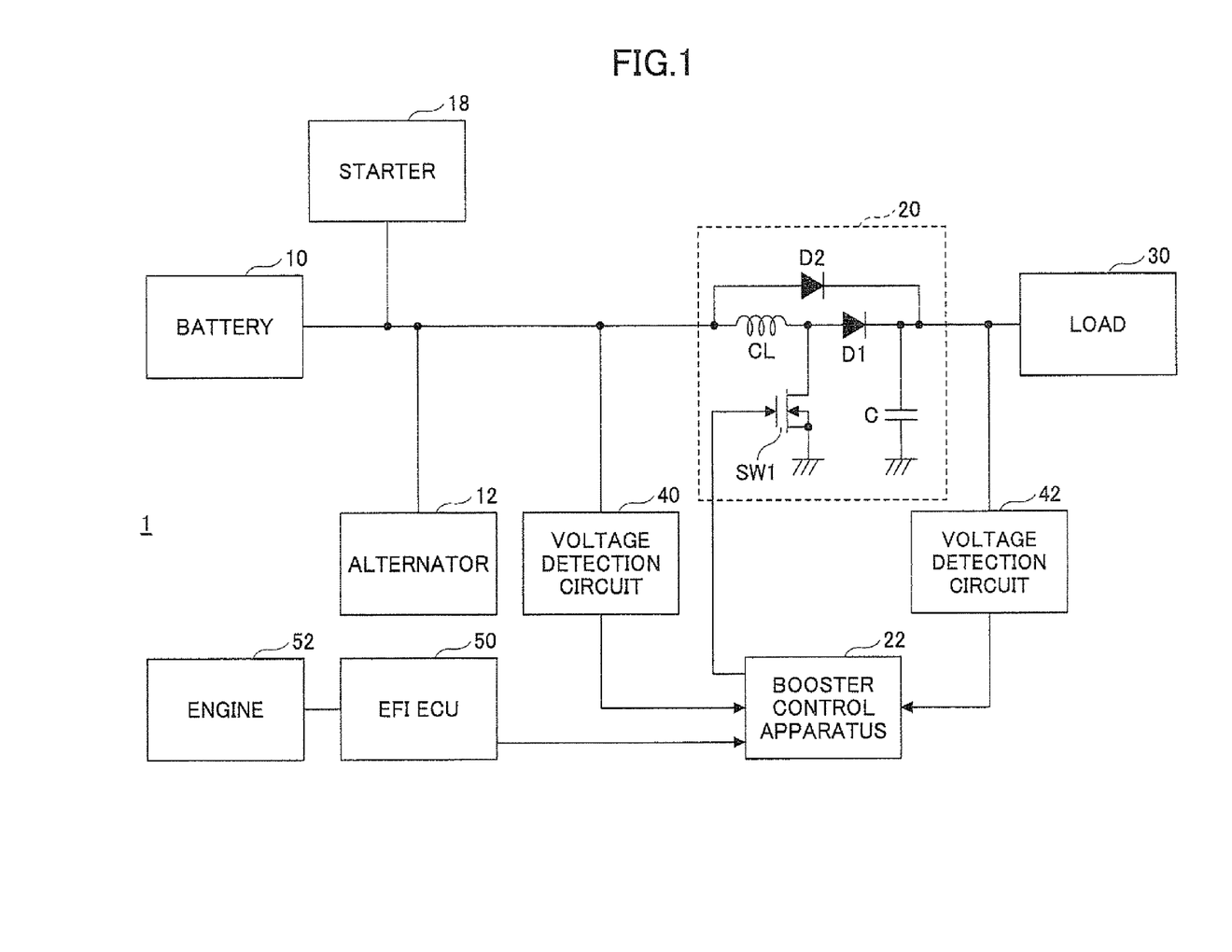
FIG. 1 is a diagram for illustrating a main configuration of an idling-stop system 1 in an idling-stop vehicle according to an embodiment of the present invention.

FIG. 1 is a diagram for illustrating a main configuration of an idling-stop system 1 in an idling-stop vehicle according to an embodiment of the present invention. The idling-stop system 1 mainly includes a battery 10, an alternator 12, a starter 18, a booster circuit 20, a booster control apparatus 22, a load 30 and an EFI-ECU 50.

The battery 10 is mounted on the vehicle. The battery 10 may be a power source for supplying electrical power to electrical systems in the vehicle. The battery 10 is a rechargeable battery in a proffered embodiment. The battery 10 may be of various types, such as a lead acid battery, a nickel hydrogen battery, and a lithium ion battery; however, the lead acid battery is used in a proffered embodiment. Further, the battery 10 may include plural batteries or may include only one battery.

The alternator 12 is mechanically connected to an engine 52. The alternator 12 generates power using the rotation of the engine 52. The alternator 12 is controlled by the EFI-ECU 52, for example, which controls the engine 52. The way of controlling the power generation of the alternator 12 may be arbitrary. For example, when the vehicle runs in a steady state or the engine 52 is idle, a target voltage to be generated by the alternator 12 is adjusted to such a value at which the electric discharge of the battery 10 doesn't occur. Further, when the vehicle slows down or the regenerative braking operates, the target voltage to be generated by the alternator 12 is adjusted to such a value which is greater than that when the vehicle runs in a steady state or the engine 52 is idle. Further, when the vehicle accelerates, the target voltage to be generated by the alternator 12 is set to zero as is the case with during the idling-stop (i.e., during the stop of the engine 52). In other words, the alternator 12 becomes inactive. It is noted that the battery 10 may be configured to accumulate electric energy generated by the alternator 12 during the traveling of the vehicle.

The starter 18 is connected to the battery 10. The starter 18 starts the engine 52 in the stop state using the electric energy from the battery when an engine start switch is operated to turn on or the idling-stop is terminated.

The booster circuit 20 is a circuit for boosting the voltage supplied from the battery 10 to keep its output voltage at a constant voltage. In this embodiment, the booster circuit 20 is connected to the battery 10 and the alternator 12 and supplies a stabilized output voltage to the load 30. In the illustrated example, the battery voltage is input to an input terminal of the booster circuit 20. In the operation of the booster circuit 20, the booster control apparatus 22 performs an on/off switching control (PWM control, for example) of a switching element (a power MOSFET, for example) with a variable duty ratio to keep the output voltage of the booster circuit 20 at a predetermined target voltage. In other words, the booster control apparatus 22 performs a feedback control to keep the output voltage the booster circuit 20 at a target voltage even if the voltage on the input side of the booster circuit 20 varies. Further, the booster control apparatus 22 stops the boosting operation temporarily when the output voltage exceeds the target voltage and thereafter restarts the boosting operation when the output voltage falls below the target voltage (see FIG. 5).

The booster circuit 20 is switched between an active state and an inactive state under the control by the booster control apparatus 22. If a boosting start signal supplied from the EFI-ECU 50 is in its OFF state, an inactive state of the booster circuit 20 (i.e., the status in which the booster circuit 20 is not operated) is implemented. In the inactive state in which the booster circuit 20 is turned off the input voltage of the booster circuit 20 is output as it is via a diode 72, for example.

The load 30 is connected to the output side of the booster circuit 20 and is connected to the battery 10 via the booster circuit 20. The load 30 is an electrical load mounted on the vehicle. The type or the number of the loads 30 is arbitrary. Typically, the load 30 is auxiliary equipment which is easily affected by a change in the voltage applied and thus induces an unnatural feeling of a user, etc. For example, the load 30 may include a lamp such as a head lamp, a tail lamp, etc., whose luminous intensity or intensity of illumination substantially changes because of a change in the voltage applied; an air conditioner (properly speaking, a blower motor) whose amount of air blown off substantially changes because of a change in the voltage applied; and a wiper (properly speaking, a wiper motor) whose wiping speed substantially changes because of a change in the voltage applied. Further, the load 30 may include a meter and the like, a display device, etc.

The booster control apparatus 22 controls the boosting operation of the booster circuit 20 as described above. The characterized portion of the way of this control is described later. The booster control apparatus 22 is configured mainly of a microprocessor that includes a CPU, a ROM in which control programs are stored, a RAM in which calculation results are stored, a timer, a counter, an input interface, an output interface, etc., for example, as is the case with an ordinary ECU. Further, the booster control apparatus 22 may include a purpose-built control circuit such as a feedback circuit (feedback control part 22b described later), etc. Further, the booster control apparatus 22 is connected to a voltage detection circuit 40 for detecting the input voltage of the booster circuit 20 and a voltage detection circuit 42 for detecting the output voltage of the booster circuit 20. The voltage detection circuits 40 and 42 may be incorporated in the booster control apparatus 22.

The EFI-ECU 50 performs an idling-stop control for reducing fuel consumption and an exhaust gas of carbon dioxide, etc., in addition to various controls of the engine 52. Specifically, with respect to the idling-stop control, when the stationary status of the vehicle is detected, the EFI-ECU 50 performs a final determination whether an idling-stop startup condition is met by checking whether other conditions for permitting the idling-stop, such as a condition as to a temperature of engine coolant, a condition as to a temperature of the battery 10, a condition as to revolutions per minute of the engine 52, are met. If the idling-stop startup condition is met, the EFI-ECU 50 sets an engine stop signal to its ON state to stop the engine 52. In this way, operations such as fuel ejection and ignition are stopped without requiring a user to turn the ignition switch from an IG ON to an IG OFF, and consequently the engine 52 makes its transition from a running state to an inactive state.

During the idling-stop, that is to say, during the temporary inactive state of the engine 52, the EFI-ECU 50 determines whether an idling-stop termination condition is met based on determinations whether a shift range of a transmission if the vehicle is an Automatic Transmission (AT) vehicle is changed from "N (neutral)" range to "D (drive)" range or a brake pedal is released. The EFI-ECU 50 determines whether an idling-stop termination condition is met based on determinations whether a clutch pedal is pressed if the vehicle is a Manual Transmission (MT) vehicle. As a result, if the idling-stop termination condition is met, the EFI-ECU 50 restarts the engine and supplies an ON signal of the boosting start signal to the booster control apparatus 22. In this way, the starter 18 starts to operate without requiring a user to turn the ignition switch from an IG ON to a Starter ON, and consequently the engine 52 restarts. When the restart of the engine 52 is completed and then the voltage of the battery 10 (i.e., a battery voltage) is restored to a normal stable voltage, the EFI-ECU 50 supplies an OFF signal of the boosting start signal to the booster control apparatus 22. Alternatively, when the restart of the engine 52 is completed and a predetermined time has elapsed from the time of starting the boosting operation, the EFI-ECU 50 may supply an OFF signal of the boosting start signal to the booster control apparatus 22.

It is noted that a part of the functions of the EFI-ECU 50 (for example, a function of determining whether the respective conditions are met in the above-mentioned idling-stop control function) or the whole of the functions of the EFI-ECU 50 may be implemented by other ECU(s) or a similar control device (including the booster control apparatus 22). Similarly, a part or the whole of the functions of the booster control apparatus 22 may be implemented by the EFI-ECU 50 or other ECU(s).

Next, features of the control of the boosting operation of the booster circuit 20 by the booster control apparatus 22 are described.

Figure 2:
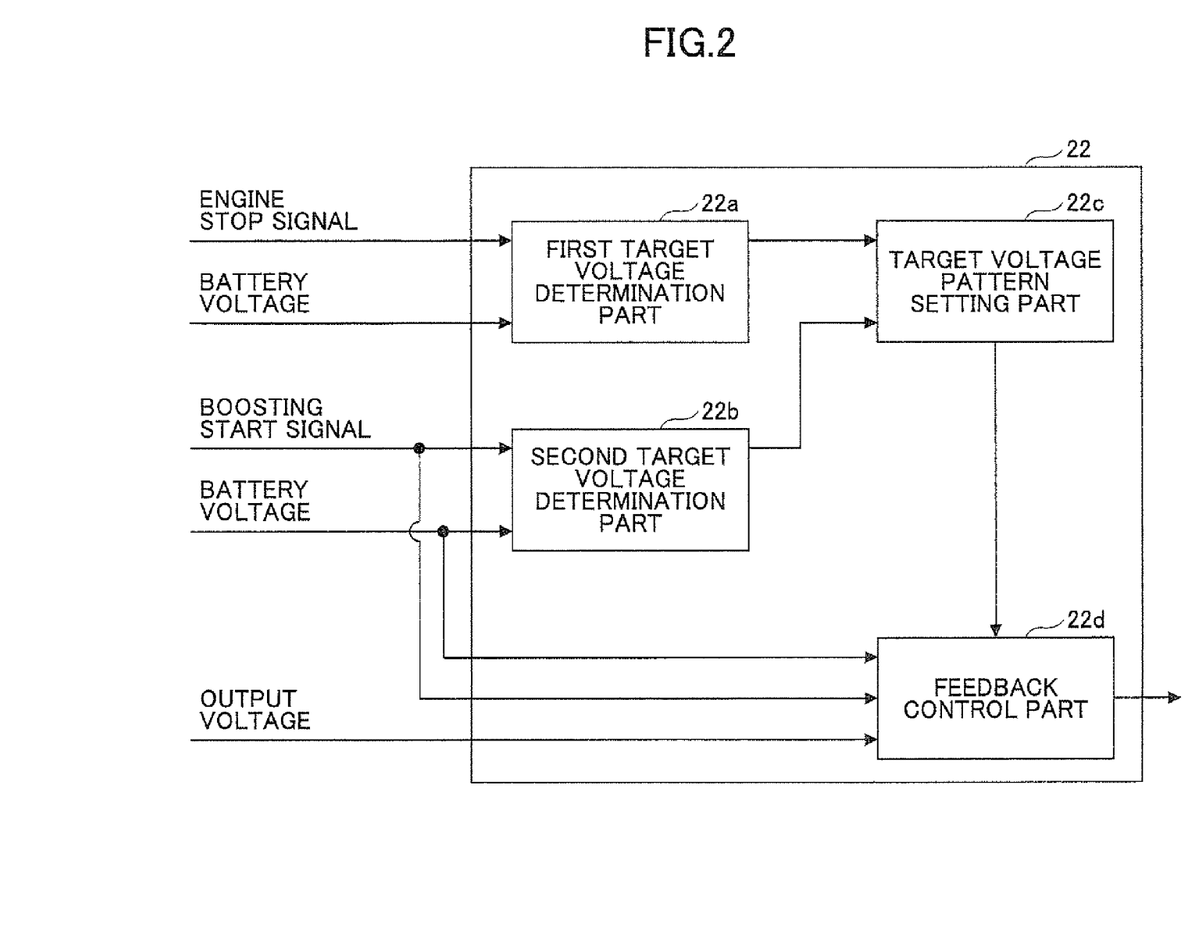
FIG. 2 is a diagram for illustrating a main function implemented by a booster control apparatus 22.

FIG. 2 is a diagram for illustrating a main function implemented by the booster control apparatus 22. The booster control apparatus 22 includes a first target voltage determination part 22a, a second target voltage determination part 22b, a target voltage pattern setting part 22c and a feedback control part 22d.

The first target voltage determination part 22a is supplied with the engine stop signal from the EFI-ECU 50. The engine stop signal becomes ON state in order to cause the engine 52 to stop. Here, the engine stop signal keeps its ON state when the engine is in its inactive state and keeps its OFF state when the engine is in its active state. It is noted that instead of the ON signal of the engine stop signal a signal representing similar information (for example, a signal representing that the idling-stop startup condition is met) may be supplied.

The first target voltage determination part 22a is supplied with a detected value of the input voltage of the boost circuit 20 from the voltage detection circuit 40. It is noted that since the alternator 12 is inactive during the idling-stop, the detected value of the input voltage of the boost circuit 20 from the voltage detection circuit 40 during the idling-stop corresponds to the voltage of the battery 10 (i.e., the battery voltage). It is also noted that instead of the detected value of the input voltage of the boost circuit 20, a detected value of a voltage sensor which measures the voltage across the battery 10 may be used.

When the engine stop signals becomes ON state (in this example, when the engine 52 becomes inactive state in connection with the idling-stop, in particular), the first target voltage determination part 22a obtains a battery voltage (a detected value of the input voltage of the boost circuit 20 from the voltage detection circuit 40) at that time, and determines the obtained battery voltage as a first target voltage. It is noted that this battery voltage corresponds to the battery voltage at the time of stopping the engine 52 (i.e., at the time of starting the idling-stop). Here, the time of stopping the engine 52 or the time of starting the idling-stop doesn't only indicate the precise instantaneous time point when the engine 52 stops and includes the times immediately before and after the time point when the engine 52 stops (or includes the times immediately before and after the time point when the idling-stop starts). This is because there is not substantial change in the battery voltage during a short period from the time immediately before the time of stopping the engine 52 to the time immediately after the time of stopping the engine 52.

The first target voltage determination part 22a may use the battery voltage at the time of stopping the engine 52 as it is as a first target voltage. Alternatively, the first target voltage determination part 22a may obtain the battery voltage at the time of stopping the engine 52 at several times (i.e., over time) and use the average value thereof as a first target voltage.

The second target voltage determination part 22b is supplied with the boosting start signal from the EFI-ECU 50. The boosting start signal becomes ON state when the restart of the engine 52 is initiated after the idling-stop as mentioned above, and becomes OFF state when the restart of the engine 52 is completed and the voltage of the battery 10 is restored to the normal stable value due to the operation of the alternator 12. The OFF timing of the boosting start signal is not limited to this example, and may be a timing when the restart of the engine 52 is completed or a timing thereafter. For example, the boosting start signal may be changed to OFF state after a lapse of a predetermined fixed time from the time of starting the boosting provided that the restart of the engine 52 is completed. It is noted that instead of the ON signal of the boosting start signal a signal representing similar information (for example, a signal representing that the idling-stop termination condition is met) may be supplied.

Similarly, the second target voltage determination part 22b is supplied with the detected value of the input voltage of the boost circuit 20 from the voltage detection circuit 40. It is noted that since the alternator 12 is substantially inactive during the idling-stop or immediately after the restart of the engine 52, the detected value of the input voltage of the boost circuit 20 from the voltage detection circuit 40 during such a time period corresponds to the voltage of the battery 10 (i.e., the battery voltage). It is also noted that instead of the detected value of the input voltage of the boost circuit 20, a detected value of a voltage sensor which measures the voltage across the battery 10 may be used.

When the boosting start signal becomes ON state, that is to say, when the restart of the engine after the idling-stop is initiated, the second target voltage determination part 22b obtains a battery voltage (a detected value of the input voltage of the boost circuit 20 from the voltage detection circuit 40) at that time, and determines the obtained battery voltage as a second target voltage. It is noted that this battery voltage corresponds to the battery voltage at the time of starting the boosting operation of the booster circuit 20 (i.e., at the time of initiating the restart of the engine 52). Here, the time of starting the boosting operation of the booster circuit 20 or the time of initiating the restart of the engine 52 doesn't only indicate the precise instantaneous time point when the boosting operation of the booster circuit 20 starts and includes the times immediately before and after the time point when the boosting operation of the booster circuit 20 starts (or includes the times immediately before and after the time point when the restart of the engine 52 is initiated). This is because there is not substantial change in the battery voltage during a short period from the time immediately before the time of starting the boosting operation of the booster circuit 20 to the time immediately after the time of starting the boosting operation of the booster circuit 20. However, when the starter operates the battery voltage changes greatly. Thus, it is necessary to set the second target voltage based on the battery voltage before the operation of the starter 18.

The second target voltage determination part 22b may use the battery voltage at the time of starting the boosting operation of the booster circuit 20 as it is as a second target voltage. Alternatively, the second target voltage determination part 22b may obtain the battery voltage at the time of starting the boosting operation of the booster circuit 20 at several times (i.e., over time) and use the average value thereof as a second target voltage. It is noted that since the battery voltage falls gradually due to an electrical discharge of the battery 10 during the idling-stop, the second target voltage becomes lower than the first target voltage.

The target voltage pattern setting part 22c sets a changing pattern in time series of the target voltage (i.e., a target voltage pattern) based on the first target voltage obtained in the first target voltage determination part 22a and the second target voltage obtained in the second target voltage determination part 22b. Specifically, the target voltage pattern setting part 22c sets the target voltage (the target voltage pattern) in such a manner that the target voltage gradually increases from the second target voltage to the first target voltage. The way of setting the target voltage pattern is described later with reference to FIG. 3.

The feedback control part 22d is supplied with the detected value of the input voltage of the boost circuit 20 from the voltage detection circuit 40, a detected value of the output voltage of the boost circuit 20 from the voltage detection circuit 42 and the boosting start signal from the EFI-ECU 50. The feedback control part 22d performs a feedback control of a switching operation (a duty ratio) of the switching element SW1 based on the target voltage pattern (the target voltage varying in time series) set in the target voltage pattern setting part 22c in such a manner that a pattern of the output voltage of the booster circuit 20 follows the target voltage pattern while monitoring the respective voltage values obtained from the voltage detection circuits 40 and 42.

Figure 3:
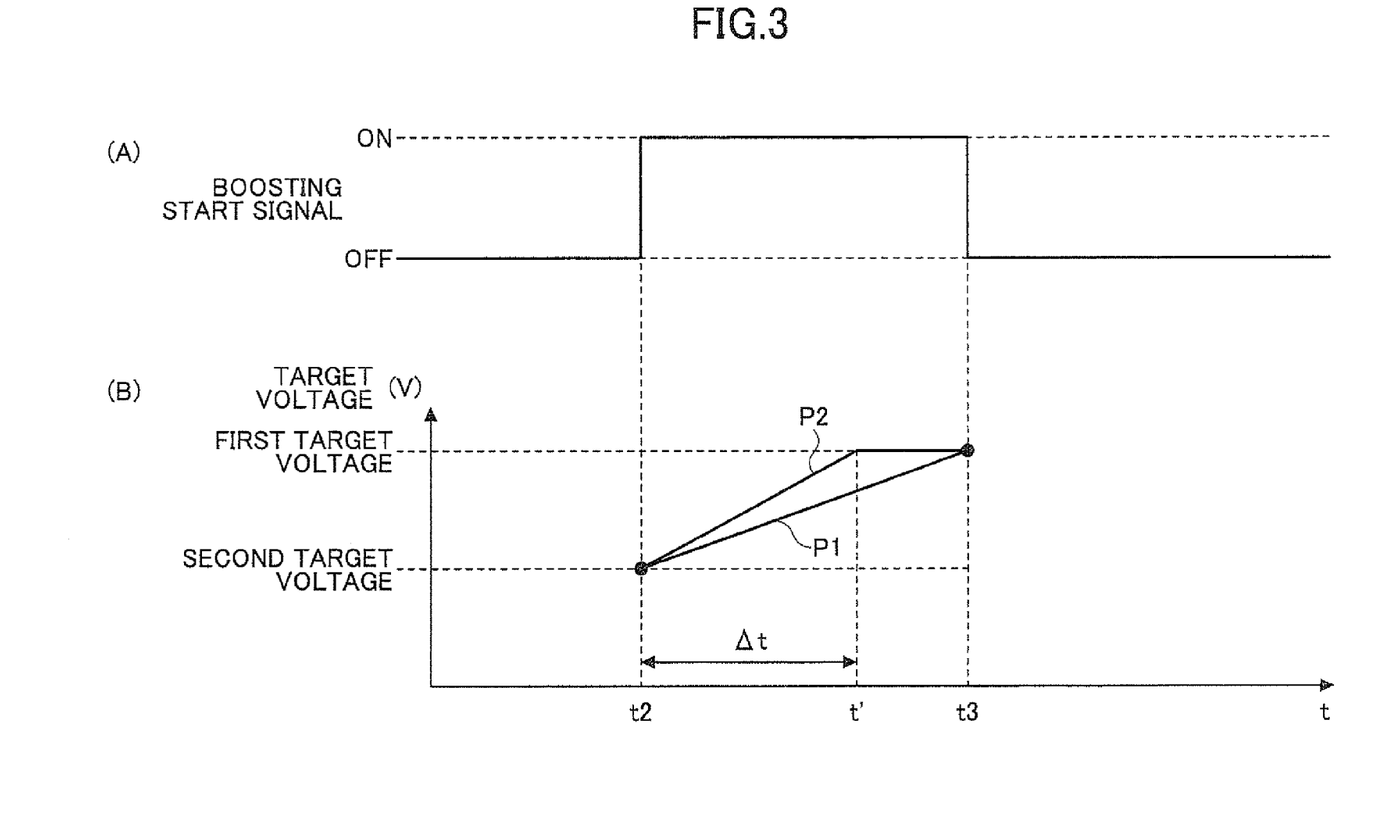
FIG. 3 is a diagram for illustrating two examples of a target voltage pattern set in a target voltage pattern setting part 22c.

FIG. 3 is a diagram for illustrating two examples of a target voltage pattern set in a target voltage pattern setting part 22c.

In FIG. 3, a portion (A) shows a waveshape of the boosting start signal in time series and a portion (B) shows the target voltage pattern. In the example shown in FIG. 3, the boosting start signal becomes ON state, that is to say, the start of the boosting operation of the booster circuit 20 is instructed, at the time t2 when the idling-stop termination condition is met, and the boosting start signal becomes OFF state at the time t3.

In FIG. 3, an example of the target voltage pattern is indicated by P1, and another example of the target voltage pattern is indicated by P2.

The target voltage pattern P1 is set in such a manner that the target voltage gradually increases from the second target voltage at the time t2 to the first target voltage at the time t3. It is noted that in the illustrated example, the target voltage pattern P1 shows that the target voltage increases in a linear manner; however, the target voltage may increase in a non-linear manner or a discontinuous manner. The target voltage pattern P1 is suited for the case where the time period from the time t2 to the time t3, that is to say, the time period from the time when the boosting start signal becomes ON state to the time when the boosting start signal becomes OFF state is a fixed value.

The target voltage pattern P2 is set in such a manner that the target voltage gradually increases from the second target voltage at the time t2 to the first target voltage at the time t' over time $\Delta t$ and thereafter (i.e., from time t' to time t3) stays at a constant value (i.e., the first target voltage). It is noted that in the illustrated example, the target voltage pattern P2 shows that the target voltage increases in a linear manner; however, the target voltage may increase in a non-linear manner or a discontinuous manner.

With respect to the target voltage pattern P2, the time period $\Delta t$ from the time t2 to the time t' may be a fixed value or a variable value. For example, the time period $\Delta t$ may be set to be shorter than a battery voltage restoring time which is taken for the battery voltage to be restored to its normal value. The battery voltage restoring time is determined based on the performance of the alternator 12, the performance of the battery 10 and the operational status of the load 30. It is noted that the battery voltage restoring time may be experimentally derived and the time period $\Delta t$ may be adapted to the derived battery voltage restoring time in advance. Alternatively, the battery voltage restoring time may be derived in real time because it could change dynamically. In this case, the time period $\Delta t$ may be adapted to the derived battery voltage restoring time in real time. Alternatively, the gradient of the target voltage pattern (and thus the time period $\Delta t$) may be determined based on an upper tolerable value of a increasing rate of the battery voltage. The upper tolerable value of the increasing rate of the battery voltage is set to such a value at which the variation in the operation of the load 30 due to the increase of the battery voltage (for example, increase in luminous intensity of the lamp or the meter) doesn't become annoying for the user. For example, about 0.5 V/100 ms may be adopted as an increasing rate (i.e., as the upper tolerable value of the increasing rate of the battery voltage) at which the increase in luminous intensity of the meter doesn't become annoying.

Figure 4:
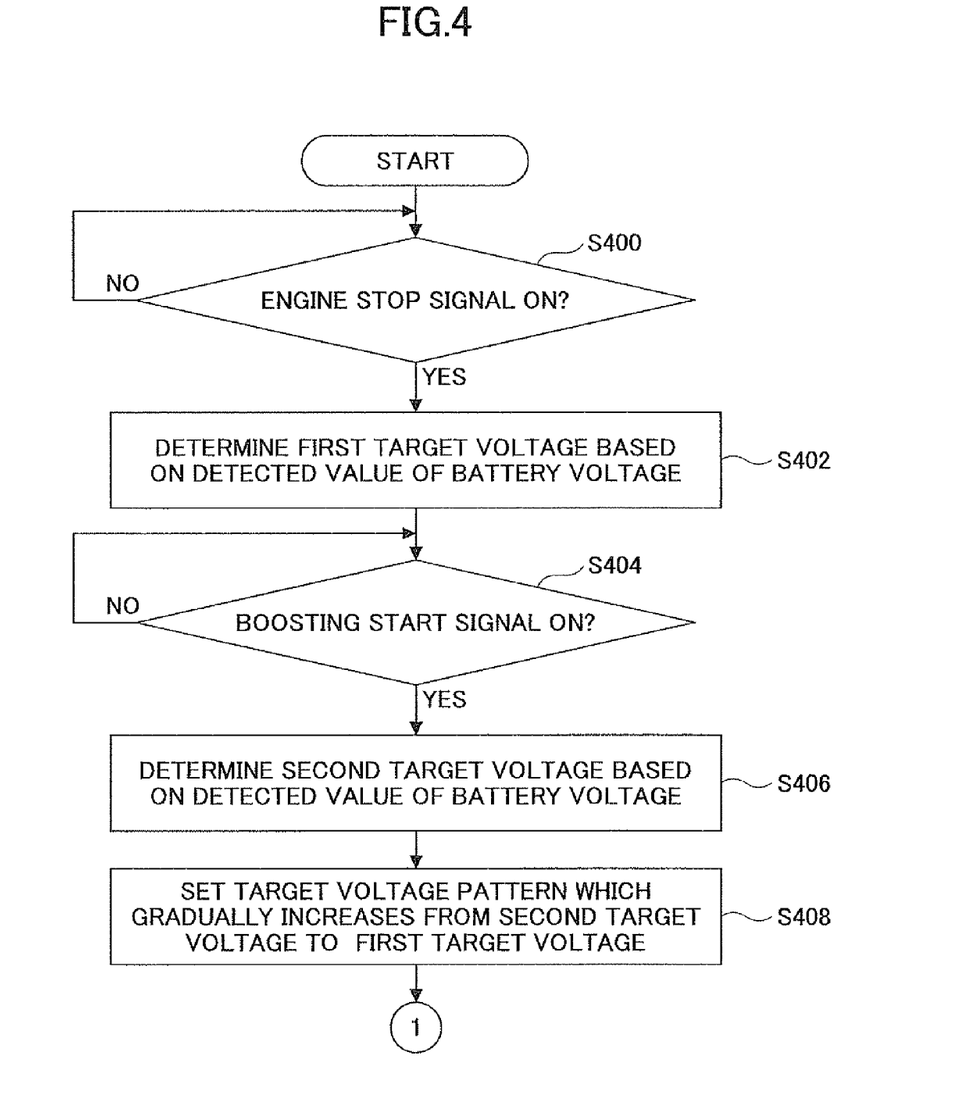
FIG. 4 is a flowchart for illustrating an example of determination processes in a first target voltage determination part 22a and a second target voltage determination part 22b and a target voltage pattern setting process in the target voltage pattern setting part 22c.

FIG. 4 is a flowchart for illustrating an example of determination processes in the first target voltage determination part 22a and the second target voltage determination part 22b and a target voltage pattern setting process in the target voltage pattern setting part 22c.

At step 400, in the first target voltage determination part 22 it is determined whether the engine stop signal from the EFI-ECU 50 becomes ON state. If it is determined that the engine stop signal from the EFI-ECU 50 becomes ON state, the process routine goes to step 402.

At step 402, in the first target voltage determination part 22a the first target voltage is determined based on the input voltage of the booster circuit 20 obtained from the voltage detection circuit 40 at this period (i.e., the latest detected value of the battery voltage).

At step 404, in the second target voltage determination part 22b it is determined whether the boosting start signal from the EFI-ECU 50 becomes ON state. If it is determined that the boosting start signal from the EFI-ECU 50 becomes ON state, the process routine goes to step 406. If it is determined that the boosting start signal from the EFI-ECU 50 becomes OFF state, the process routine waits until the boosting start signal from the EFI-ECU 50 becomes ON state.

At step 406, in the second target voltage determination part 22b the second target voltage is determined based on the input voltage of the booster circuit 20 obtained from the voltage detection circuit 40 at this period (i.e., the latest detected value of the battery voltage). It is noted that there is a commonality between the first target voltage determined at step 402 and the second target voltage determined at step 406 in that they are set based on the detected value of the input voltage of the booster circuit 20 obtained from the voltage detection circuit 40; however, the first target voltage and the second target voltage are set based on the detected value of the input voltage of the booster circuit 20 obtained at different timing. Therefore, the first target voltage and the second target voltage are different from each other. In general, since the battery voltage falls gradually during the idling-stop, the second target voltage becomes lower than the first target voltage.

At step 408, in the target voltage pattern setting part 22c, the target voltage pattern of the booster circuit 20 is set based on the first target voltage determined at step 402 and the second target voltage determined at step 406. Specifically, the target voltage pattern is set in a manner that the target voltage gradually increases from the second target voltage to the first target voltage (see FIG. 3) When the process at step 408 is terminated, the process routine proceeds to a process routine shown in FIG. 5, which is described below.

Figure 5:
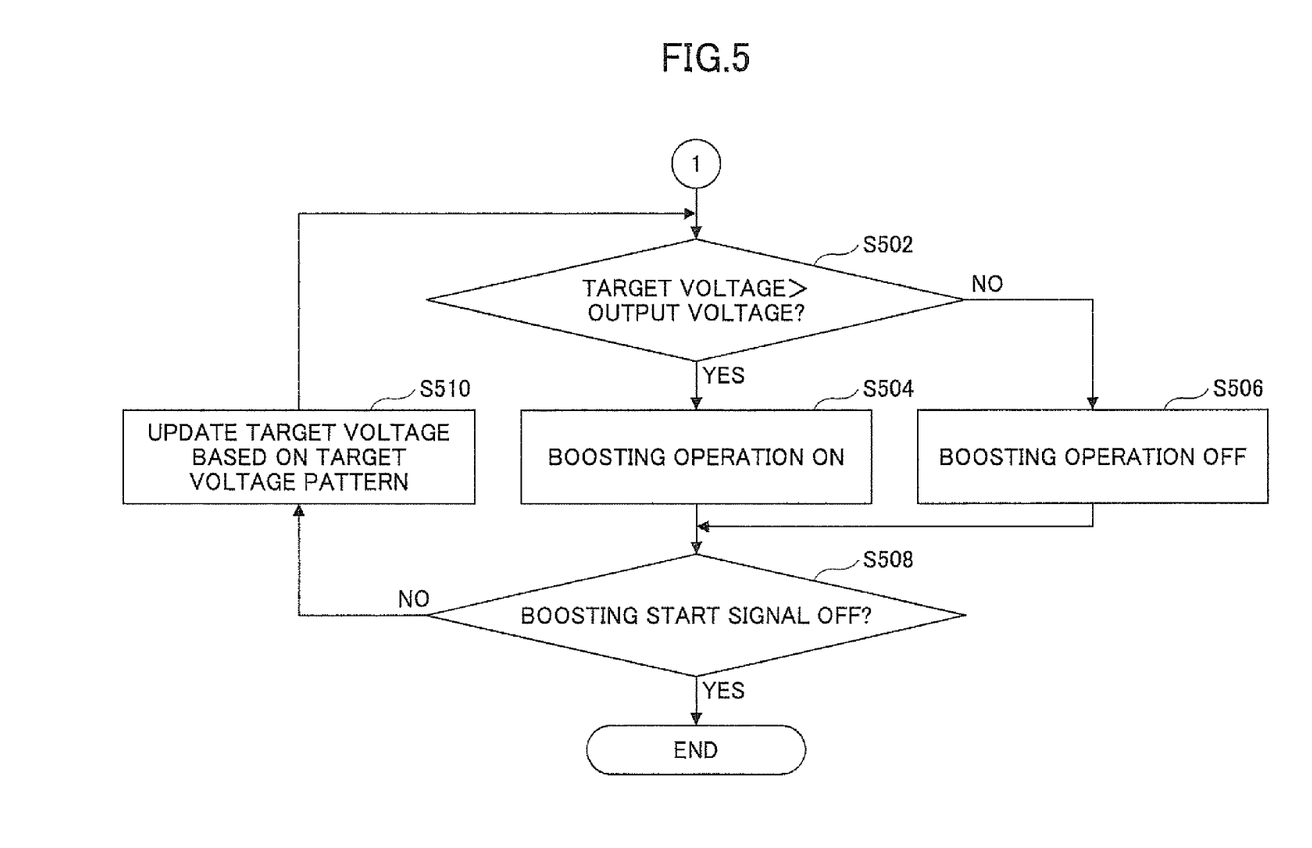
FIG. 5 is a flowchart for illustrating an example of a main process executed by a feedback control part 22d.

FIG. 5 is a flowchart for illustrating an example of a main process executed by the feedback control part 22d. The process routine in FIG. 5 is executed subsequent to the above-mentioned process of step 408 in FIG. 4.

At step 502, in the feedback control part 22d it is determined whether the output voltage of the booster circuit 20 obtained from the voltage detection circuit 42 at this period (i.e., the latest detected value) is lower than the target voltage (i.e., the target voltage based on the target voltage pattern set in the target voltage pattern setting process shown in FIG. 4). If it is determined that the output voltage of the booster circuit 20 is lower than the target voltage, the process routine goes to step 504. If it is determined that the output voltage of the booster circuit 20 is higher than or equal to the target voltage, the process routine goes to step 506.

At step 504, in the feedback control part 22d the boosting operation of the booster circuit 20 is activated (or kept being activated) based on the current target voltage (i.e., the target voltage based on the target voltage pattern set in the target voltage pattern setting process shown in FIG. 4). In other words, the feedback control is performed so as to make the output voltage of the booster circuit 20 follow the target voltage. When the process at step 504 is terminated, the process routine goes to step 508.

At step 506, in the feedback control part 22d the boosting operation of the booster circuit 20 is deactivated (i.e., stopped). When the process at step 506 is terminated, the process routine goes to step 508.

At step 508, in the feedback control part 22d it is determined whether the OFF signal of the boosting start signal is input from the EFI-ECU 50. If it is determined whether the OFF signal of the boosting start signal is input from the EFI-ECU 50, the process routine is terminated. On the other hand, it is determined whether the OFF signal of the boosting start signal is not input from the EFI-ECU 50, the process routine goes to step 510.

At step 510, the target voltage is updated based on the target voltage pattern (see FIG. 3) set in the target voltage pattern setting process shown in FIG. 4. In other words, the target voltage to be used at the next period is set based on the target voltage pattern set in the target voltage pattern setting process shown in FIG. 4. The process routine returns to step 502 after completing the process of step 510, and then the process routine of the next period is executed. Thus, at step 502 it is determined whether a new target voltage updated in step 510 is higher than the output voltage of the booster circuit 20 obtained from the voltage detection circuit 42 (i.e., the latest detected value).

Figure 6:
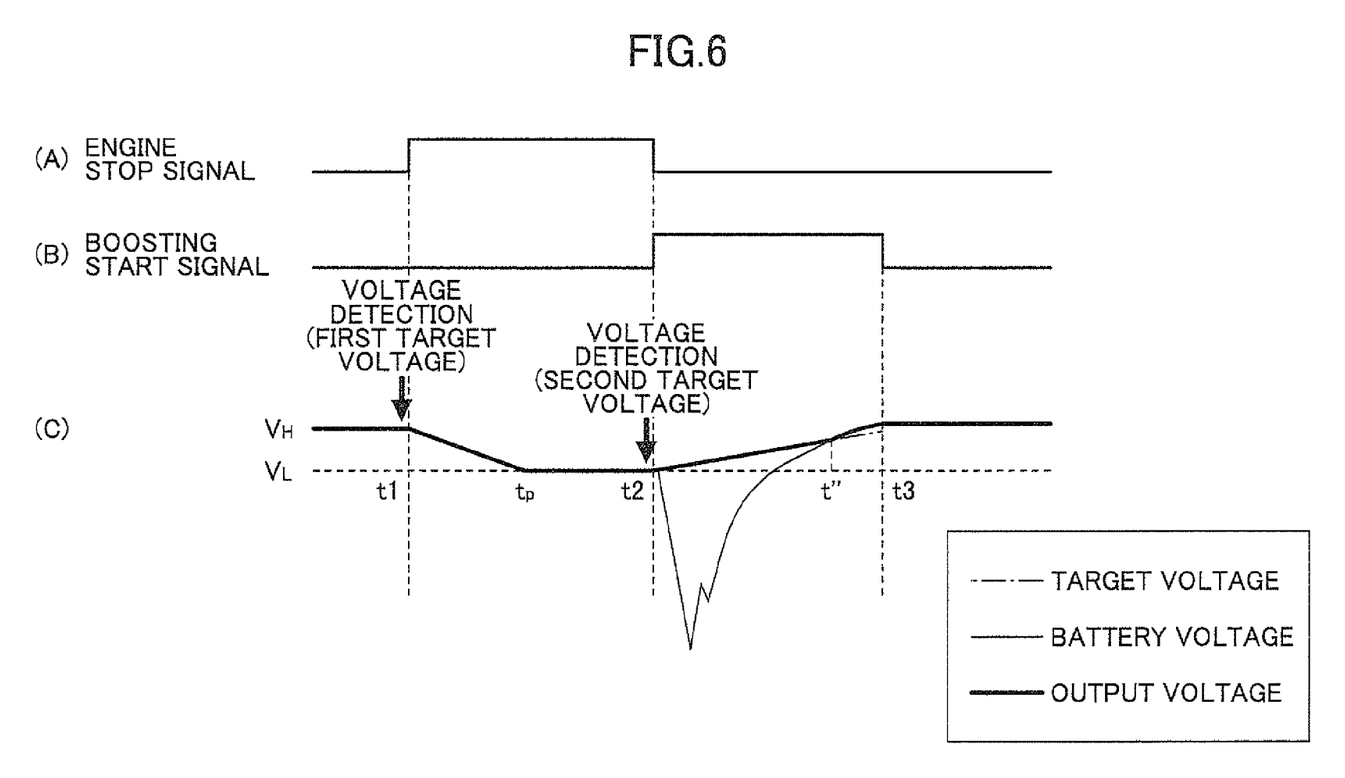
FIG. 6 is a diagram for illustrating a variation in an output voltage of the booster circuit 20 when the target voltage pattern according to the embodiment is applied.

FIG. 6 is a diagram for illustrating a variation in an output voltage of the booster circuit 20 when the target voltage pattern according to the embodiment is applied. In FIG. 6, (A) shows a waveshape of the engine stop signal in time series, (B) shows a waveshape of the boosting start signal in time series, and (C) shows a target voltage pattern (alternate long and short dashed line), a waveshape of a battery voltage (narrow line) and a waveshape of an output voltage of the booster circuit 20 (bold line) in time series.

In the example shown in FIG. 6, at time t1, the idling-stop startup condition is met and thus the engine stop signal is set to its ON state, at time t2, the idling-stop termination condition is met and thus the boosting start signal is set to its ON state (i.e., the boosting operation of the booster circuit 20 is instructed to start), and at time 3, the boosting start signal is set to its OFF state.

The battery voltage varies in the following manner. It is noted that in FIG. 6 (C), the battery voltage (narrow line) is the same as the output voltage of the booster circuit 20 (bold line) before time t2 and after time t", and thus is not visible due to being overwritten by the output voltage (bold line). As shown in FIG. 6 (C), since the engine 52 and the alternator 12 are operated before time t1, the battery voltage and the output voltage of the booster circuit 20 maintains a substantially constant and relatively high value $V_H$. At time t1, when the engine stop signal is set to its ON state, the engine 52 is stopped, and thus the alternator 12 is stopped. Thus, as shown in FIG. 6 (C), the battery voltage and the output voltage of the booster circuit 20 slowly decrease. The battery voltage and the output voltage of the booster circuit 20 stabilize at a substantially constant decreased value $V_L$ at time $t_p$. At time t2, when the idling-stop termination condition is met, the starter 18 is operated, and then the battery voltage steeply decreases. After that, when the restart of the engine 52 has succeeded, the starter 18 is stopped, and thus the battery voltage steeply increases. Further after that, the alternator 12 operates, and the battery voltage increases to be restored to the voltage before the execution of idling-stop.

The target voltage pattern is set in the following manner. In this example, the values of the battery voltage detected at the timing indicated by "voltage detection" in the drawing are determined as the first target voltage and the second target voltage, respectively. Specifically, the battery voltage (the alternator generation voltage) $V_H$ immediately before the ON signal of the engine stop signal becomes active (i.e., engine stop) is detected to be determined as the first target voltage. Further, the battery voltage $V_L$ immediately before the ON signal of the boosting start signal becomes active (i.e., starting of the boosting operation) is detected to be determined as the second target voltage. In the illustrated example, the target voltage pattern (alternate long and short dashed line) is set in such a manner as shown in FIG. 3. In other words, as shown in FIG. 6 (C), the target voltage is set to the second target voltage $V_L$ at time t2, and afterward the target voltage is set to increase toward the first target voltage $V_H$ gradually. It is noted that the target voltage pattern (alternate long and short dashed line) is the same as the output voltage of the booster circuit 20 (bold line) from time t2 to time t", and thus is not visible due to being overwritten by the output voltage (bold line).

The output voltage of the booster circuit 20 varies in the following manner. Before time t2, since the booster circuit 20 is not operated, the output voltage of the booster circuit 20 varies in the same manner as the battery voltage, as mentioned above. Between time t2 and time t" (when the output voltage exceeds the target voltage), since the booster circuit 20 is in operation, the output voltage of the booster circuit 20 slowly varies following the target voltage, in spite of the steep change of the battery voltage as mentioned above. After time t" when the output voltage exceeds the target voltage, since the booster circuit 20 is changed from its active state to its inactive state (see step 502 and step 506 in FIG. 5), the output voltage of the booster circuit 20 varies in the same manner as the battery voltage. Here, as mentioned above, after time t", the battery voltage is substantially restored to the voltage $V_H$ before the execution of idling-stop. Therefore, after time t", the variation in the output voltage of the booster circuit 20 is also small and the output voltage of the booster circuit 20 keeps a stable value.

In this way, according to the embodiment, when the booster circuit 20 is activated in connection with the restart of the engine after the idling-stop, the target voltage of the booster circuit 20 is set in such a manner that the target voltage increases gradually from the battery voltage at the time of starting of the boosting operation to the battery voltage at the time of stopping of the engine. Thus, it is possible to slowly increase the output voltage of the booster circuit 20. As a result of this, it is possible to appropriately prevent problems due to the steep changes in the output voltage of the booster circuit 20, such as blinking of lighting equipment, a steep variation in blower air flow, a steep variation in wiper speed, etc.

Figure 7:
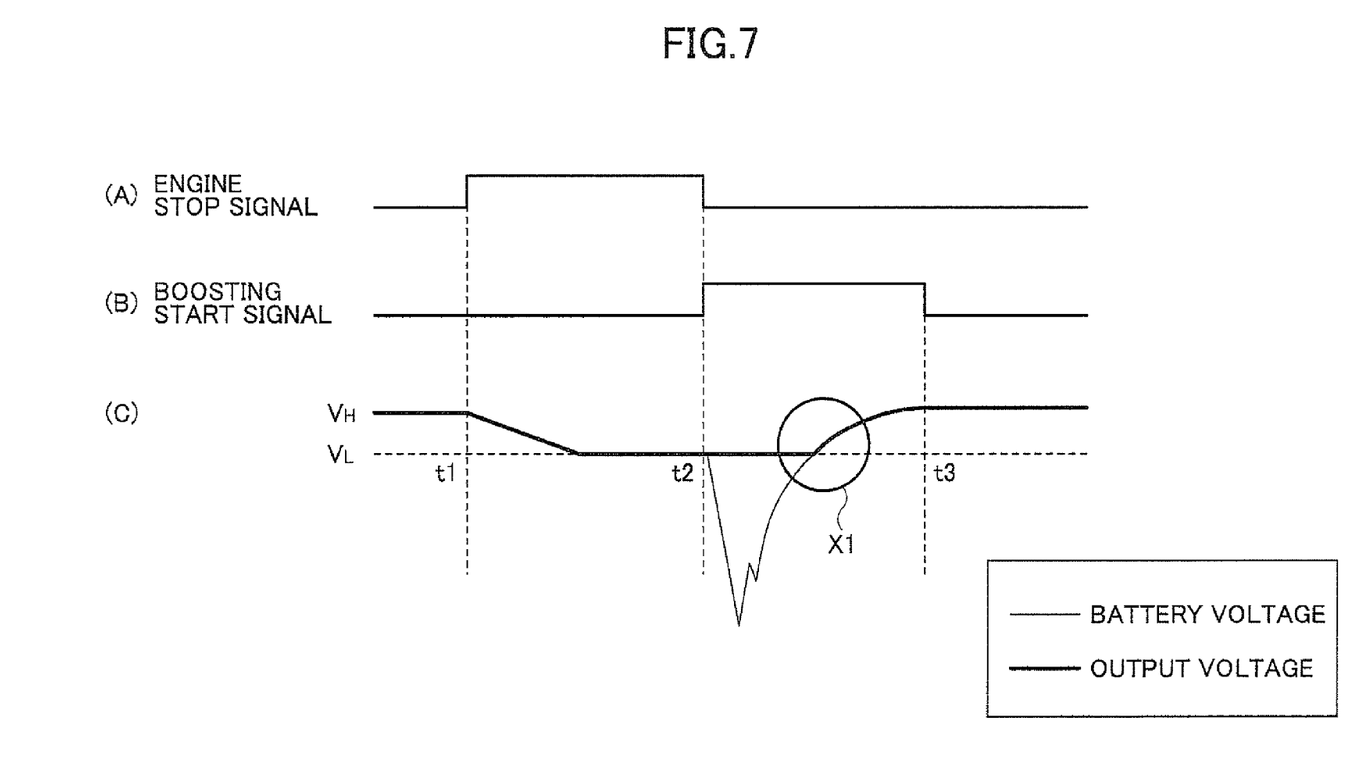
FIG. 7 is a diagram for illustrating a variation in an output voltage of the booster circuit when the target voltage is set according to a first comparative example.
Figure 8:
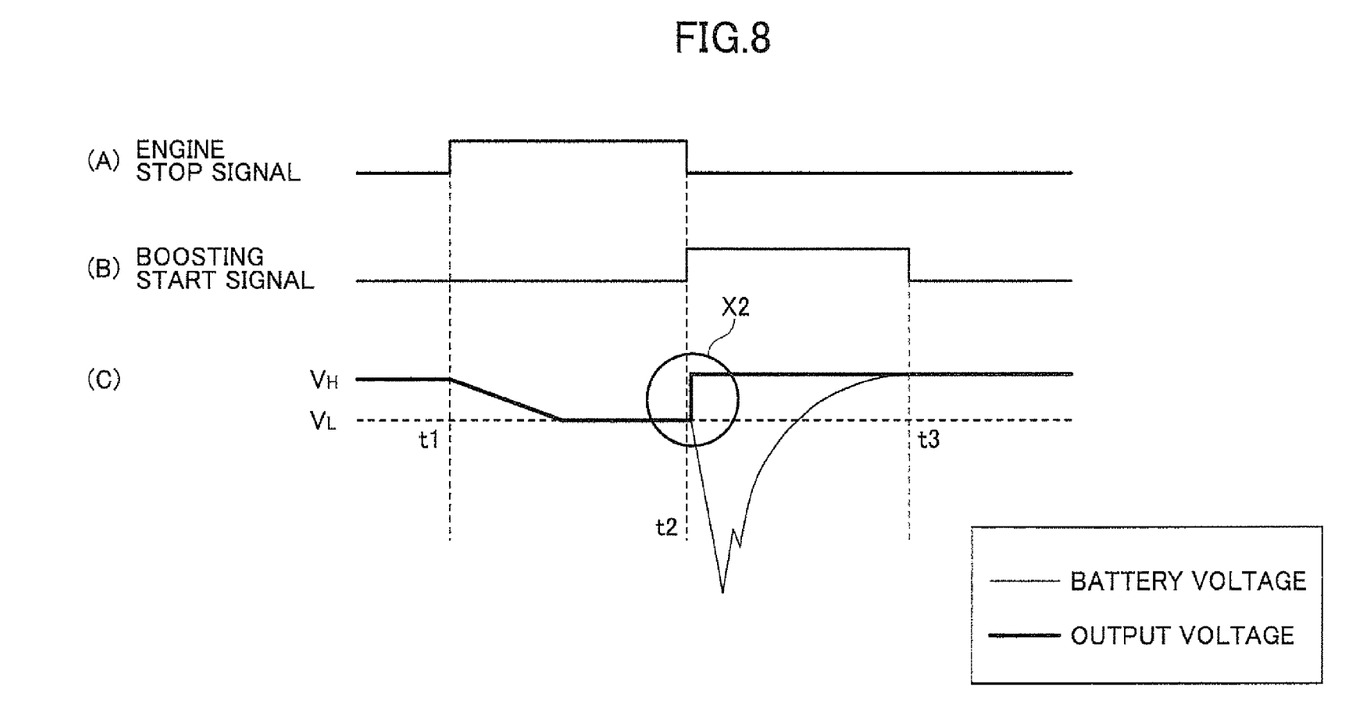
FIG. 8 is a diagram for illustrating a variation in an output voltage of the booster circuit when the target voltage is set according to a second comparative example.
Figure 9:
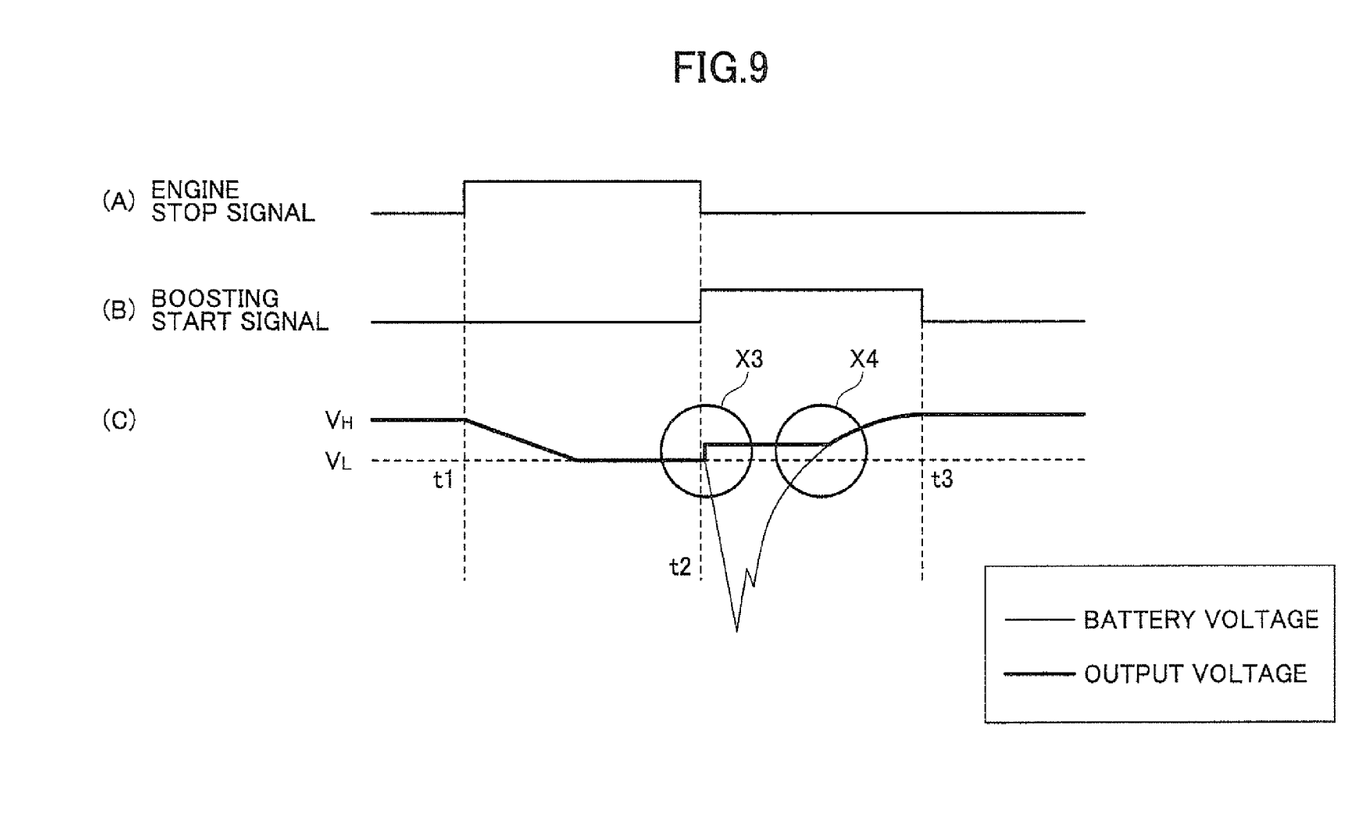
FIG. 9 is a diagram for illustrating a variation in an output voltage of the booster circuit when the target voltage is set according to a third comparative example.

Here, for a comparative purpose, with reference to FIGS. 7-9, a variation in an output voltage of the booster circuit is described if the target voltage is set according to comparative examples.

FIG. 7 is a diagram for illustrating a variation in an output voltage of the booster circuit when the target voltage is set according to a first comparative example. In FIG. 7, (A) shows a waveshape of the engine stop signal in time series, (B) shows a waveshape of the boosting start signal in time series, and (C) shows a waveshape of a battery voltage (narrow line) and a waveshape of an output voltage of the booster circuit (bold line) in time series. In the first comparative example, the target voltage is set to a constant value which is the battery voltage $V_L$ (see FIG. 6) immediately before the ON signal of the boosting start signal becomes active (i.e., starting of the boosting operation).

In the first comparative example, since the target voltage is set to the battery voltage $V_L$ at the time of starting of the boosting operation, there is no steep change appearing in the output voltage of the booster circuit at the time of starting of the boosting operation (around time t2). However, as indicated in circle X1 in FIG. 7, when the battery voltage increases steeply in connection with the stop of the operation of the starter 18 and the initiation of the operation of the alternator 12, the output voltage of the booster circuit is influenced directly by the steep increase of the battery voltage, and thus there is a steep variation appearing in the output voltage of the booster circuit. If such a steep variation in the output voltage of the booster circuit occurs, the problems such as blinking of lighting equipment, a steep variation in blower air flow, and a steep variation in wiper speed, etc., occur, as mentioned above.

FIG. 8 is a diagram for illustrating a variation in an output voltage of the booster circuit when the target voltage is set according to a second comparative example. In FIG. 8, (A) shows a waveshape of the engine stop signal in time series, (B) shows a waveshape of the boosting start signal in time series, and (C) shows a waveshape of a battery voltage (narrow line) and a waveshape of an output voltage of the booster circuit (bold line) in time series. In the second comparative example, the target voltage is set to a constant value which is the battery voltage $V_H$ (see FIG. 6) immediately before the ON signal of the engine stop signal becomes active (i.e., engine stop).

In this second comparative example, since the target voltage is set to the battery voltage $V_H$ at the time of stopping of the engine, a steep variation as is the case with the first comparative example doesn't occur. In other words, a steep variation in the output voltage of the booster circuit doesn't occur when the battery voltage increases. However, at the beginning of the boosting operation (around time t2), as indicated in circle X2 in FIG. 8, a steep variation in the output voltage of the booster circuit occurs due to a large difference between the target voltage and the battery voltage at the time of starting of the boosting operation. Similarly, if such a steep variation in the output voltage of the booster circuit occurs, the problems such as blinking of lighting equipment, a steep variation in blower air flow, a steep variation in wiper speed, etc., occur.

FIG. 9 is a diagram for illustrating a variation in an output voltage of the booster circuit when the target voltage is set according to a third comparative example. In FIG. 9, (A) shows a waveshape of the engine stop signal in time series, (B) shows a waveshape of the boosting start signal in time series, and (C) shows a waveshape of a battery voltage (narrow line) and a waveshape of an output voltage of the booster circuit (bold line) in time series. In the third comparative example, the target voltage is set to a constant value which is an intermediate value ($=(V_H+V_L)/2$) between the battery voltage $V_H$ at the time of stopping of the engine and the battery voltage $V_L$ at the time of starting of the boosting operation.

In this third comparative example, due to the same reason as is the case with the above-mentioned first and second comparative examples, similar variations occur. Specifically, at the beginning of the boosting operation (around time t2), as indicated in circle X3 in FIG. 9, a relatively great variation in the output voltage of the booster circuit occurs due to a difference between the target voltage and the battery voltage. Further, as indicated in circle X4 in FIG. 9, when the battery voltage increases in connection with the stop of the operation of the starter 18 and the initiation of the operation of the alternator 12, the output voltage of the booster circuit is influenced directly by the increase of the battery voltage, and thus there is a relatively great variation appearing in the output voltage of the booster circuit. Although such variations are smaller than the variation in the output voltage of the booster circuit in the above-mentioned first and second comparative examples, the same problems occur.

According to the present embodiment described above, the following effect among others can be obtained.

According to the embodiment, as mentioned above, when the booster circuit 20 is activated in connection with the restart of the engine after the idling-stop, the target voltage of the booster circuit 20 is set in such a manner that the target voltage increases gradually from the battery voltage at the time of starting of boosting operation to the battery voltage at the time of stopping of the engine. Thus, it is possible to prevent a steep variation in the output voltage of the booster circuit 20 to be supplied to the load 30. As a result of this, it is possible to appropriately prevent problems due to the steep changes in the output voltage of the booster circuit 20, such as blinking of lighting equipment, steep change in blower air flow, steep change in wiper speed, etc.

The present invention is disclosed with reference to the preferred embodiments. However, it should be understood that the present invention is not limited to the above-described embodiments, and variations and modifications may be made without departing from the scope of the present invention.

For example, in the above-described embodiments, the detection of battery voltage used for determining the first target voltage and the second target voltage is triggered by the ON signal of the engine stop signal and the ON signal of the boosting start signal. Specifically, the detection of the battery voltage at the time of stopping of the engine and the battery voltage at the time of starting of boosting operation is triggered by the ON signal of the engine stop signal and the ON signal of the boosting start signal. However, the detection of the battery voltage at the time of stopping of the engine and the battery voltage at the time of starting of boosting operation may be triggered by other equivalent signals. For example, one of various signals by which the idling-stop startup condition is met (for example, a vehicle speed signal representing the vehicle speed zero, a brake signal representing that a brake pedal is pressed down, etc.) or a combination of such various signals may trigger the detection of the battery voltage at the time of stopping of the engine. Similarly, one of various signals by which the idling-stop termination condition is met (for example, a brake signal representing that a brake pedal is released, a clutch signal representing that a clutch pedal is pressed down in the case of a vehicle with a manual transmission, etc.) or a combination of such various signals may trigger the detection of the battery voltage at the time of starting of boosting operation. These triggers may be appropriately determined depending on the idling-stop startup condition and the idling-stop termination condition which may be variable.

Further, the battery voltage at the time of stopping of the engine may be estimated based on other detected values or known design values. For example, the battery voltage at the time of stopping of the engine may be estimated to be equivalent to the battery voltage when the vehicle is predicted to stop. In this case, the battery voltage (including an average battery voltage derived through the detection at several times) detected when the vehicle is predicted to stop may be set as the first target voltage. In this case, the vehicle stop may be predicted based on a vehicle speed signal (for example, change in a vehicle speed from a certain constant speed to a speed lower than a predetermined speed), a brake signal (for example, successive brake operations for a predetermined time period), an accelerator signal (for example, a pedal off operation of the accelerator pedal), or a combination thereof. Further, in addition to or instead of this, the vehicle stop due to a red traffic light may be predicted based on positional information on an intersection from a navigation apparatus or positional information on a traffic light and positional information on the vehicle from a GPS receiver. Further, in addition to or instead of this, similarly, the vehicle stop due to a red traffic light may be predicted based on an image recognition result of the traffic light using a camera for monitoring a forward environment of the vehicle. Alternatively, considering the fact there is not a substantial difference between the battery voltage at the time of stopping of the engine and the battery voltage at a normal driving status (in which status the battery voltage stabilizes), the battery voltage (including an average battery voltage derived through the detection at several times) detected at a normal driving status may be set as the first target voltage. In a simplified embodiment, the battery voltage at the normal driving status may be estimated to be equal to a rated voltage of the battery 10.

Similarly, the battery voltage at the time of starting of the boosting operation may be estimated based on other detected values or known design values. For example, an amount of a drop of the voltage during the idling-stop may be derived based on experiments or the like. In this case, the battery voltage at the time of starting of the boosting operation may be estimated by subtracting the amount of the drop of the voltage from the battery voltage at the time of stopping of the engine. Further, a voltage drop manner such as a gradient of the voltage drop during the idling-stop may be monitored. In this case, the battery voltage at the time of starting of the boosting operation may be estimated to be equivalent to the battery voltage when the voltage drop is reduced such as when the gradient of the voltage drop becomes substantially zero (i.e., the battery voltage around time $t_p$ in FIG. 6 (C)).

Further, the above-mentioned embodiment is related to the control when the booster circuit 20 is activated in connection with the restart of the engine 52 after the idling-stop. At the time of an ordinary start of the engine 52, that is to say, at the time of a start of the engine 52 when a user operates an ignition switch or an engine start switch, the booster circuit 20 is not operated in general. This is because in such a special situation of the ordinary start of the engine 52 a user has little concern for the blinking of lighting equipment, etc. However, it is also possible to perform a boosting control of the booster circuit 20 at the time of an ordinary start of the engine 52 as is the case with the time of the restart of the engine 52 after the idling-stop. In this case, it is possible to easily apply the above-described embodiments. Specifically, when the booster circuit 20 is activated in connection with the ordinary start of the engine 52, the target voltage of the booster circuit 20 is set in such a manner that the target voltage increases gradually from the battery voltage at the time of starting of the boosting operation to the battery voltage at the time of stopping of the engine. In this case, the battery voltage at the time of stopping of the engine may be the battery voltage at the time of stopping of the engine detected at the previous trip (use) of the vehicle. Alternatively, in a simplified embodiment, the battery voltage at the normal driving status may be estimated to be equal to a rated voltage of the battery 10. It is noted that in the case of the present invention being applied to the ordinary start of the engine the vehicle is not necessarily a vehicle in which the idling-stop system is provided.

The invention claimed is:

1. A booster control apparatus for controlling a booster provided between a battery and a load in an idling-stop vehicle in which a boosting operation of the booster is initiated in connection with a restart of an engine after an idling-stop, said booster control apparatus comprising:
    a first target voltage determination part configured to determine a first target voltage, based on a detected value or an estimated value of a voltage of the battery at the beginning of the idling-stop;
    a second target voltage determination part configured to determine a second target voltage, based on a detected value or an estimated value of a voltage of the battery at the beginning of the boosting operation of the booster;
    a target voltage setting part configured to set a target voltage for an output voltage of the booster; and
    a controlling part configured to control the booster based on the target voltage set by the target voltage setting part in such a manner that the output voltage of the booster follows the target voltage, wherein
    when the boosting operation of the booster is initiated in connection with the restart of the engine after the idling-stop, the target voltage setting part sets the target voltage in such a manner that the target voltage gradually increases from the second target voltage determined by the second target voltage determination part to the first target voltage determined by the first target voltage determination part.

2. The booster control apparatus as claimed in claim 1, wherein when the boosting operation of the booster is initiated in connection with the restart of the engine after the idling-stop, the target voltage setting part sets the target voltage in such a manner that the target voltage gradually increases over a predetermined time or with a predetermined increasing speed from the second target voltage determined by the second target voltage determination part to the first target voltage determined by the first target voltage determination part.

3. An idling-stop system which stops an engine when a vehicle stops and automatically restarts the engine based on a status of the vehicle, comprising:
 a battery;
 a load;
 a booster which is provided between the battery and the load and configured to boost the battery voltage and output the boosted battery voltage to the load; and
 a booster control apparatus as claimed in claim 1 for controlling the booster.

4. A booster control method of controlling a booster provided between a battery and a load in an idling-stop vehicle in which a boosting operation of the booster is initiated in connection with a restart of an engine after an idling-stop, said booster control method comprising:
 a first target voltage determination step of determining a first target voltage, based on a detected value or an estimated value of a voltage of the battery at the beginning of the idling-stop;
 a second target voltage determination step of determining a second target voltage, based on a detected value or an estimated value of a voltage of the battery at the beginning of the boosting operation of the booster;
 a target voltage setting step of setting a target voltage for an output voltage of the booster; and
 a controlling step of controlling the booster based on the target voltage set at the target voltage setting step in such a manner that the output voltage of the booster follows the target voltage, wherein
 when the boosting operation of the booster is initiated in connection with the restart of the engine after the idling-stop, the target voltage setting step sets the target voltage in such a manner that the target voltage gradually increases from the second target voltage determined at the second target voltage determination step to the first target voltage determined at the first target voltage determination step.

5. A booster control apparatus for controlling a booster provided between a battery and a load in a vehicle in which a boosting operation of the booster is initiated in connection with an engine start, said booster control apparatus comprising:
 a first target voltage determination part configured to determine a first target voltage, based on a detected value or an estimated value of a voltage of the battery at the time of a stop of the engine;
 a second target voltage determination part configured to determine a second target voltage, based on a detected value or an estimated value of a voltage of the battery at the beginning of the boosting operation of the booster;
 a target voltage setting part configured to set a target voltage for an output voltage of the booster; and
 a controlling part configured to control the booster based on the target voltage set by the target voltage setting part in such a manner that the output voltage of the booster follows the target voltage, wherein
 when the boosting operation of the booster is initiated in connection with the engine start, the target voltage setting part sets the target voltage in such a manner that the target voltage gradually increases from the second target voltage determined by the second target voltage determination part to the first target voltage determined by the first target voltage determination part.

\* \* \* \* \*